US011211059B2

(12) United States Patent
Kim et al.

(10) Patent No.: US 11,211,059 B2
(45) Date of Patent: Dec. 28, 2021

(54) ARTIFICIAL INTELLIGENCE APPARATUS AND METHOD FOR RECOGNIZING SPEECH WITH MULTIPLE LANGUAGES

(71) Applicant: LG ELECTRONICS INC., Seoul (KR)

(72) Inventors: Jaehong Kim, Seoul (KR); Hyoeun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 113 days.

(21) Appl. No.: 16/680,407

(22) Filed: Nov. 11, 2019

(65) Prior Publication Data
US 2021/0110818 A1 Apr. 15, 2021

(30) Foreign Application Priority Data
Oct. 10, 2019 (KR) .................. 10-2019-0125033

(51) Int. Cl.
| | | |
|---|---|---|
| G10L 15/22 | (2006.01) | |
| G10L 15/197 | (2013.01) | |
| G10L 15/00 | (2013.01) | |
| G10L 15/187 | (2013.01) | |
| G10L 25/93 | (2013.01) | |

(52) U.S. Cl.
CPC .......... *G10L 15/197* (2013.01); *G10L 15/005* (2013.01); *G10L 15/187* (2013.01); *G10L 15/22* (2013.01); *G10L 25/93* (2013.01); *G10L 2015/223* (2013.01)

(58) Field of Classification Search
CPC ..... G10L 15/97; G10L 15/005; G10L 15/187; G10L 15/22; G10L 25/93; G10L 2015/223

USPC .......................................................... 704/235
See application file for complete search history.

(56) References Cited

U.S. PATENT DOCUMENTS

| | | | |
|---|---|---|---|
| 2018/0314689 A1* | 11/2018 | Wang ................. | G10L 15/07 |
| 2018/0374476 A1* | 12/2018 | Lee .................... | G06F 3/167 |
| 2019/0103097 A1* | 4/2019 | Li ...................... | G06F 40/53 |

OTHER PUBLICATIONS

H. Li, B. Ma and K. A. Lee, "Spoken Language Recognition: From Fundamentals to Practice," in Proceedings of the IEEE, vol. 101, No. 5, pp. 1136-1159, May 2013, doi: 10.1109/JPROC.2012.2237151. (Year: 2013).*

(Continued)

*Primary Examiner* — Bharatkumar S Shah
(74) *Attorney, Agent, or Firm* — Lee Hong Degerman Kang & Waimey

(57) ABSTRACT

Disclosed herein an artificial intelligence apparatus for recognizing speech with multiple languages including a microphone, and a processor configured to obtain, via the microphone, speech data including speech of a user with multiple languages, calculate a word recognition reliability of each word in the obtained speech data using an acoustic model of a main language, calculate a word recognition reliability of each word in the obtained speech data using an acoustic model of at least one sub language, select a language having a highest word recognition reliability for each word, convert the speech data into text in consideration of a word recognition result corresponding to the selected language for each word, and generate a speech recognition result corresponding to the speech data using the converted text.

9 Claims, 11 Drawing Sheets

(56) References Cited

OTHER PUBLICATIONS

H. Li, B. Ma and K. A. Lee, "Spoken Language Recognition: From Fundamentals to Practice," in Proceedings of the IEEE, vol. 101, No. 5, pp. 1136-1159, May 2013, doi: 10.1109/JPROC.2012.2237151. (Year: 2013) (Year: 2013).*

* cited by examiner

FIG. 11

| MAIN LANGUAGE | SUB LANGUAGE |
|---|---|
| KOREAN | ENGLISH, JAPANESE |
| ENGLISH | SPANISH, FRENCH |
| JAPANESE | ENGLISH |

ARTIFICIAL INTELLIGENCE APPARATUS AND METHOD FOR RECOGNIZING SPEECH WITH MULTIPLE LANGUAGES

CROSS-REFERENCE TO RELATED APPLICATIONS

Pursuant to 35 U.S.C. § 119(a), this application claims the benefit of earlier filing date and right of priority to Korean Patent Application No. 10-2019-0125033, filed on Oct. 10, 2019, the contents of which are hereby incorporated by reference herein in its entirety.

BACKGROUND

The present disclosure relates to an artificial intelligence (AI) apparatus and method for recognizing speech with multiple languages, and one particular implementation relates to an artificial intelligence apparatus and method for recognizing speech by combining speech recognition results generated using speech recognition models of several languages from speech with multiple languages.

Recently, apparatuses for performing control by receiving sound are increasing. Apparatuses such as artificial intelligence speakers or smartphones for providing a speech recognition function recognize speech uttered by users and perform control corresponding to a result of recognition or provide a response.

With gradual globalization, words (loanwords) borrowed from the other languages or foreign words have been introduced into each language and thus the uttered speech of a user may include multiple languages. Since a speech recognition model is classified for each language, the recognition rate of a sentence in which multiple languages is mixed may be low. Each speech recognition model is trained to recognize the borrowed words or foreign words. However, such speech recognition models provide high recognition performance only when the borrowed words or foreign words are read with the pronunciation of the corresponding languages. When the borrowed words or foreign words are read with the pronunciation of an original language or another language, recognition may not be correct.

SUMMARY

An object of the present disclosure is to provide an artificial intelligence apparatus and method for recognizing uttered speech of a user by combining word recognition results using an acoustic model of a main language and an acoustic model of at least one sub language when the uttered speech of the user with multiple languages is recognized.

According to an embodiment, provided are an artificial intelligence apparatus and method for obtaining speech data including speech of a user with multiple languages, calculating a word recognition reliability of each word in the obtained speech data using an acoustic model of a main language and an acoustic model of at least one sub language, selecting a language having a highest word recognition reliability for each word, converting the speech data into text in consideration of a word recognition result corresponding to the selected language for each word, and generating a speech recognition result corresponding to the speech data using the converted text.

According to an embodiment, provided are an artificial intelligence apparatus and method for, when a user sets a main language, setting at least one sub language corresponding to the set main language based on preset sub language mapping information.

According to an embodiment, provided are an artificial intelligence apparatus and method for calculating probabilities that each predetermined window unit of the speech data corresponds to each phone using an acoustic model for each language, and calculating the word recognition reliability of each word for each language using at least one of a highest probability value $p1$ among the calculated probabilities or a difference $p1$-$p2$ between $p1$ and a second highest probability $p2$ among the calculated probabilities.

According to an embodiment, provided are an artificial intelligence apparatus and method for converting speech data into text, by replacing a word recognition result corresponding to a selected word with a corresponding word in the main language, if the selected language is not a main language for each word in the speech data.

BRIEF DESCRIPTION OF THE DRAWINGS

The present disclosure will become more fully understood from the detailed description given herein below and the accompanying drawings, which are given by illustration only, and thus are not limitative of the present disclosure, and wherein:

FIG. 11 is a view illustrating an example of sub language mapping information according to an embodiment of the present disclosure.

DETAILED DESCRIPTION OF THE EMBODIMENTS

Figure 1:
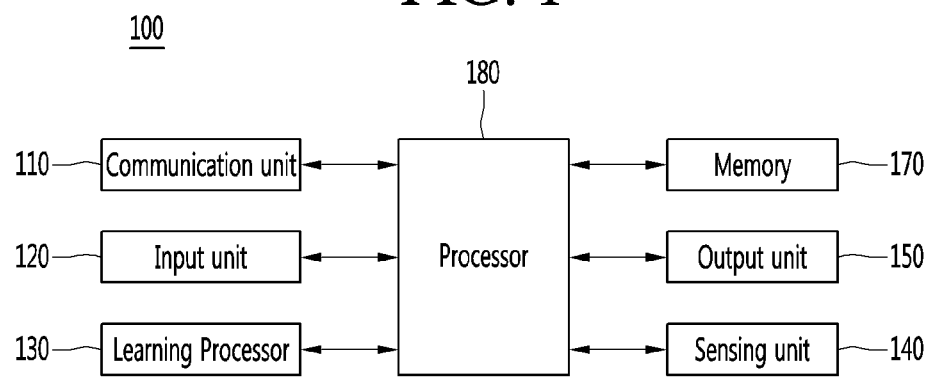
FIG. 1 is a block diagram illustrating an AI apparatus according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present disclosure.

Hereinafter, the AI apparatus 100 may be referred to as a terminal.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

Here, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a training data for model learning and an input data to be used when an output is acquired by using learning model. The input unit 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information about the AI apparatus 100, ambient environment information about the AI apparatus 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

Here, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
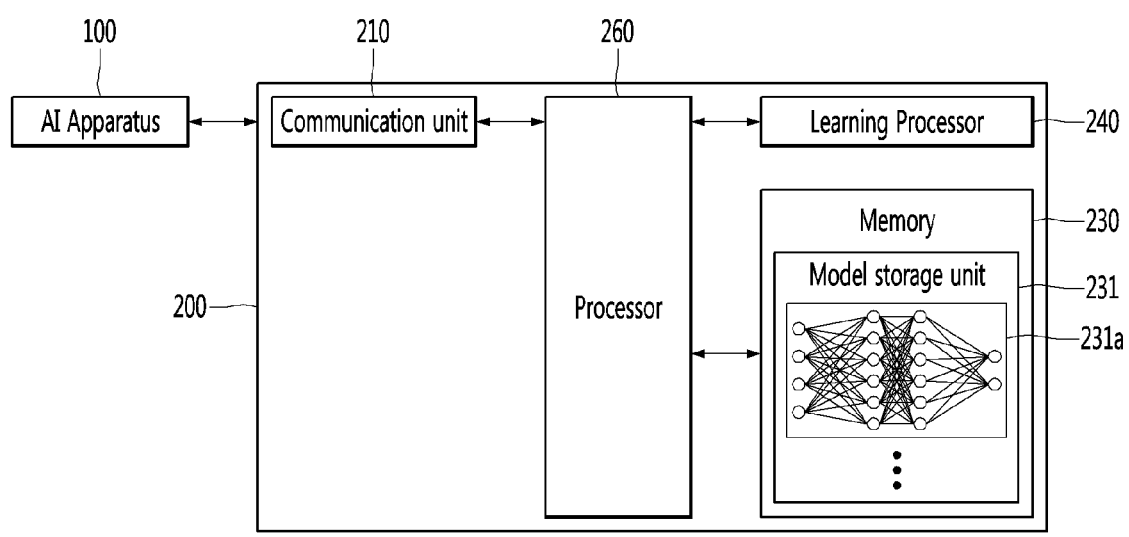
FIG. 2 is a block diagram illustrating an AI server according to an embodiment of the present disclosure.

FIG. 2 is a block diagram illustrating an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
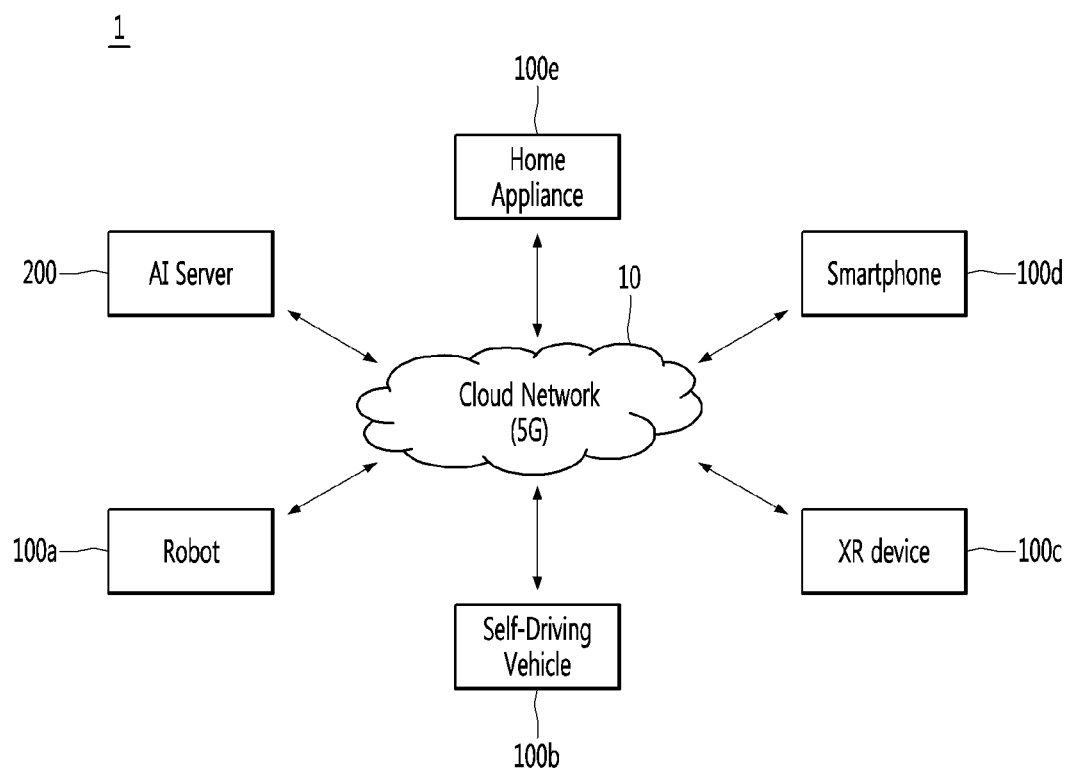
FIG. 3 is a view illustrating an AI system according to an embodiment of the present disclosure.

FIG. 3 is a view illustrating an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. Here, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling route by using the recognized surrounding information or object information. The learning model may be learned directly from the self-driving vehicle 100a or may be learned from an external device such as the AI server 200.

Here, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. Here, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

Here, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given route without the user's control or moves for itself by determining the route by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

Here, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
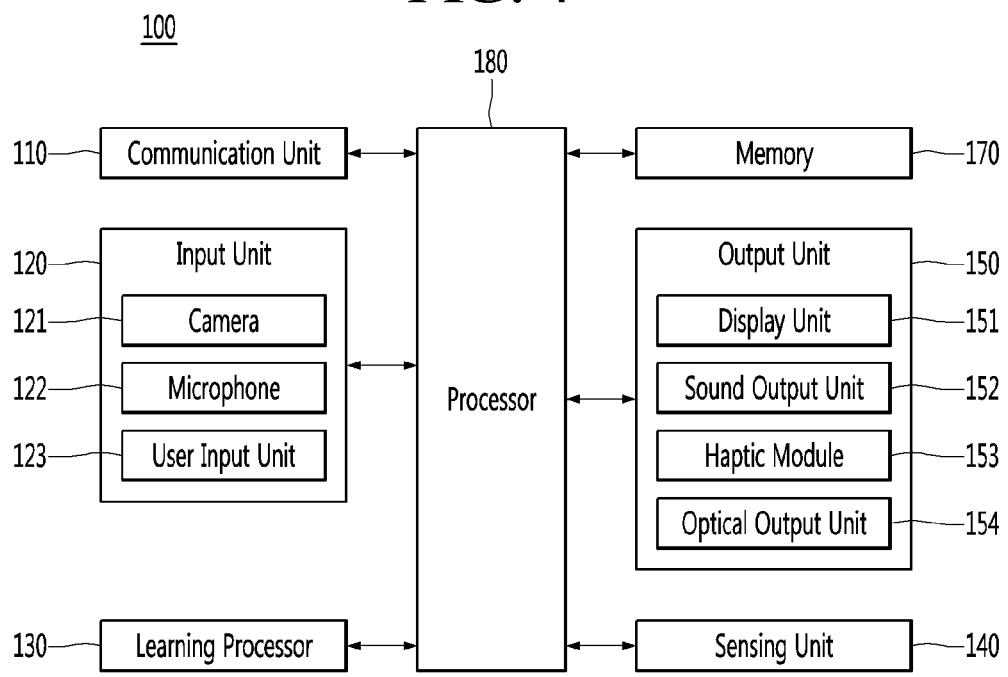
FIG. 4 is a block diagram illustrating an AI apparatus according to an embodiment of the present disclosure.

FIG. 4 is a block diagram illustrating an AI apparatus 100 according to an embodiment of the present disclosure.

The redundant repeat of FIG. 1 will be omitted below.

The communication unit 110 may also be referred to as a communication modem or a communication circuit.

Referring to FIG. 4, the input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the AI apparatus 100 to correspond to the inputted information.

The user input unit 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensing unit 140 may also be referred to as a sensor unit.

The output unit 150 may include at least one of a display unit 151, a sound output module 152, a haptic module 153, or an optical output module 154.

The display unit 151 may display (output) information processed in the AI apparatus 100. For example, the display unit 151 may display execution screen information of an application program running on the AI apparatus 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the AI apparatus 100 and a user, and an output interface between the AI apparatus 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of alight source of the AI apparatus 100. An example of an event occurring in the AI apparatus 100 includes message reception, call signal reception, missed calls, alarm, schedule notification, e-mail reception, and information reception through an application.

Figure 5:
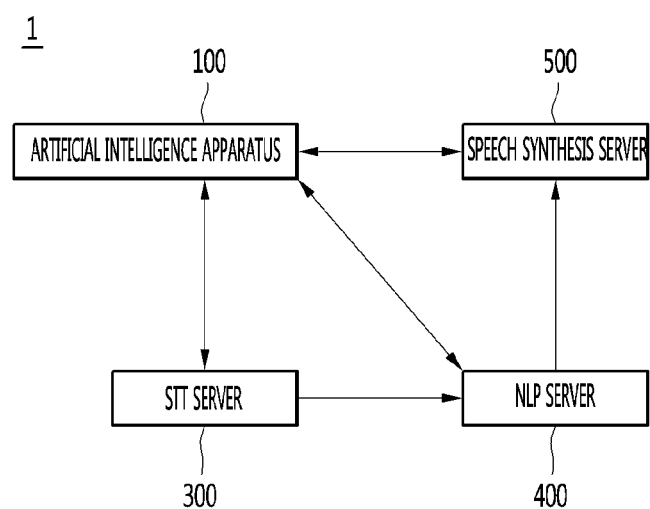
FIG. 5 is a block diagram illustrating an AI system according to an embodiment of the present disclosure.

FIG. 5 is a block diagram illustrating an AI system 1 according to an embodiment of the present disclosure.

Referring to FIG. 5, the AI system 1 may include an AI apparatus 100, a speech-to-text (STT) server 300, a natural language processing (NLP) server 400 and a speech synthesis server 500.

The AI apparatus 100 may transmit speech data to the STT server 300. The STT server 300 may convert the speech data received from the AI apparatus 100 into text data. The NLP server 400 may receive text data from the STT server 300. The NLP server 400 may analyze the intent of the text data based on the received text data. The NLP server 400 may transmit intent analysis information indicating the result of analyzing the intent to the AI apparatus 100 or the speech synthesis server 500. The speech synthesis server 500 may generate a synthesis speech reflecting the intent of the user based on the intent analysis information and transmit the generated synthesis speech to the AI apparatus 100.

The STT server 300 may increase accuracy of speech-to-text conversion using a language model. The language model may mean a model capable of calculating a probability of a sentence or calculating a probability of outputting a next word when previous words are given. For example, the language model may include probabilistic language models such as a unigram model, a bigram model and an N-gram model. The unigram is a model that assumes that all words are completely independent of each other and calculates a probability of a word sequence as a product of probabilities of words. The bigram model is a model that assumes that use of a word depends on only one previous word. The N-gram model is a model that assume that use of a word depends on previous (n−1) words.

That is, the STT server 300 may determine whether the converted text data is appropriately converted from the speech data using a language model, thereby increasing accuracy of conversion from the speech data into the text data.

The NLP server 400 may sequentially perform a morpheme analysis step, a syntax analysis step, a speech-act analysis step, an interaction processing step with respect to text data, thereby generating intent analysis information.

The morpheme analysis step refers to a step of classifying the text data corresponding to the speech uttered by the user into morphemes as a smallest unit having a meaning and determining the part of speech of each of the classified morphemes. The syntax analysis step refers to a step of classifying the text data into a noun phrase, a verb phrase, an adjective phrase, etc. using the result of the morpheme analysis step and determining a relation between the classified phrases. Through the syntax analysis step, the subject, object and modifier of the speech uttered by the user may be determined. The speech-act analysis step refers to a step of analyzing the intent of the speech uttered by the user using the result of the syntax analysis step. Specifically, the speech-act step refers to a step of determining the intent of a sentence such as whether the user asks a question, makes a request, or expresses simple emotion. The interaction processing step refers to a step of determining whether to answer the user's utterance, respond to the user's utterance or question about more information, using the result of the speech-act step.

The NLP server 400 may generate intent analysis information including at least one of the answer to, a response to, or a question about more information on the intent of the user's utterance, after the interaction processing step.

Meanwhile, the NLP server 400 may receive the text data from the AI apparatus 100. For example, when the AI apparatus 100 supports the speech-to-text conversion function, the AI apparatus 100 may convert the speech data into the text data and transmit the converted text data to the NLP server 400.

The speech synthesis server 500 may synthesize prestored speech data to generate a synthesized speech. The speech synthesis server 500 may record the speech of the user selected as a model and divide the recorded speech into syllables or words. The speech synthesis server 500 may store the divided speech in an internal or external database in syllable or word units.

The speech synthesis server 500 may retrieve syllables or words corresponding to the given text data from the database and synthesize the retrieved syllables or words, thereby generating the synthesized speech.

The speech synthesis server 500 may store a plurality of speech language groups respectively corresponding to multiple languages. For example, the speech synthesis server 500 may include a first speech language group recorded in Korean and a second speech language group recorded in English.

The speech synthesis server 500 may translate text data of a first language into text of a second language and generate a synthesized speech corresponding to the translated text of the second language using the second speech language group.

The AI system 1 may further include an AI server 200. The AI server 200 may learn at least one of an STT engine used in the STT server 300, an NLP engine used in the NLP server 400 or a speech synthesis engine used in the speech synthesis server 500. That is, at least one of the STT server 300, the NLP server 400 or the speech synthesis server 500 may use models or engines trained in the AI server 200.

Although the AI apparatus 100, the STT server 300, the NLP server 400 and the speech synthesis server 500 are shown as being divided in FIG. 5, the present disclosure is not limited thereto. In one embodiment, some of the AI server 200, the STT server 300, the NLP server 400 or the speech synthesis server 500 may be configured as one server. In one embodiment, some of the STT server 300, the NLP server 400 or the speech synthesis server 500 may be included in the AI apparatus 100. This means that the AI apparatus 100 performs the function of the STT server 300, the NLP server 400 or the speech synthesis server 500.

Figure 6:
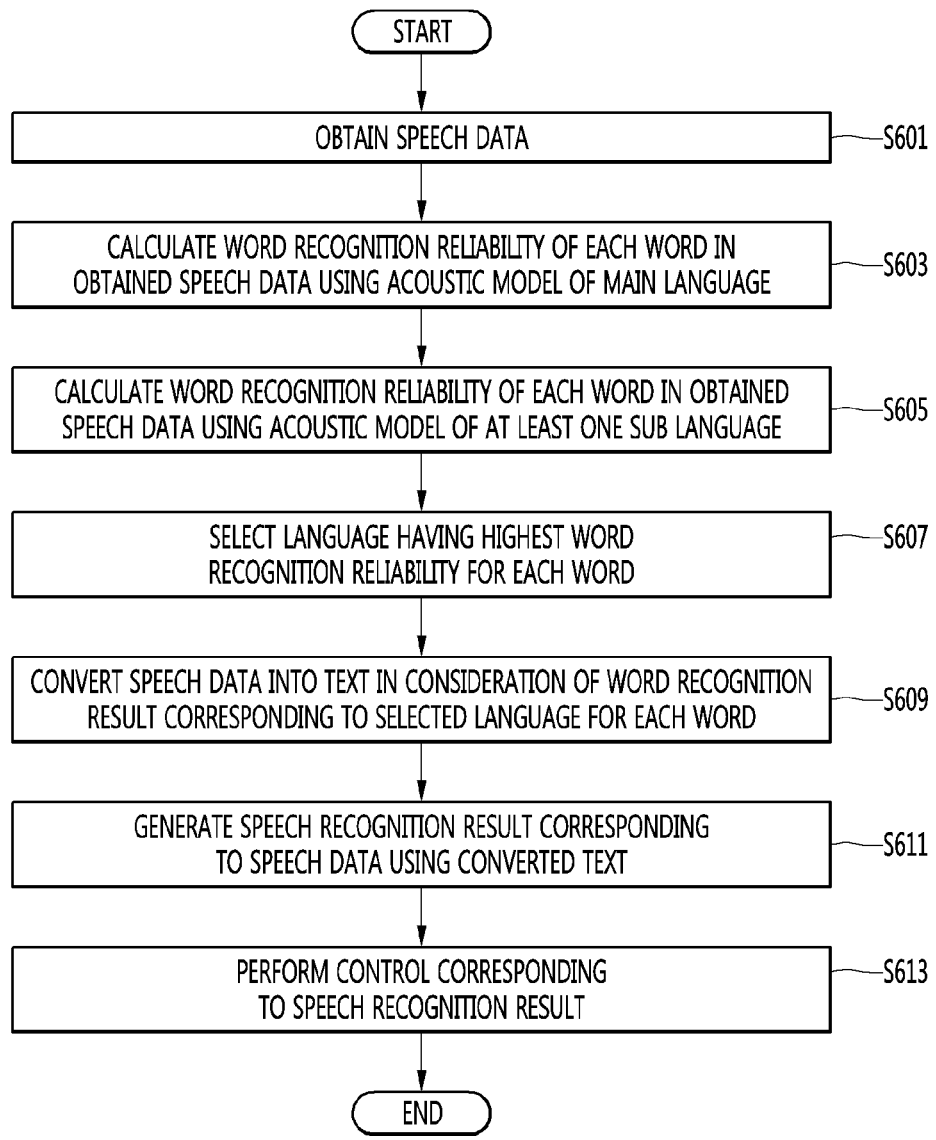
FIG. 6 is a flowchart illustrating a method of recognizing speech including multiple languages according to an embodiment of the present disclosure.

FIG. 6 is a flowchart illustrating a method of recognizing speech including multiple languages according to an embodiment of the present disclosure.

Referring to FIG. 6, the processor 180 of the artificial intelligence apparatus 100 obtains speech data including speech of a user (S601).

The processor 180 may obtain the speech data via the microphone 122 or receive the speech data from an external apparatus (not shown) via the communication unit 110.

The speech data may be obtained by converting a sound wave including the speech of the user into a digital signal. For example, the speech data may be an audio file in various formats such as pulse code modulation (PCM), wave or mp3.

The speech of the user may be uttered speech including a command for controlling the artificial intelligence apparatus 100 and a query for searching for information.

The processor 180 may remove noise from the obtained speech data as preprocessing. The processor 180 may directly generate speech data, from which noise is removed, using a noise removal engine or a noise removal filter or transmit the sound data to the artificial intelligence server 200 and receive the speech data, from which noise is removed. In addition, the volume of the speech data may be controlled according to a predetermined level. Control of the volume of the speech data may be regarded as part of the preprocessing. Hereinafter, the speech data may mean the speech data, from which noise is removed via preprocessing.

In addition, the processor 180 of the artificial intelligence apparatus 100 may calculate a word recognition reliability of each word in the obtained speech data using the acoustic model of a main language (S603).

The speech recognition model used to recognize the uttered speech included in the speech data may include a speech-to-text (STT) engine for converting speech data into text and a natural language processing (NLP) model for analyzing and extracting meaning information in text. The STT engine may include an acoustic model (AM) and a language model (LM).

Recognizing speech using the speech recognition model of a specific language may mean that sound of speech data is recognized in phone or phoneme units using the acoustic model of the corresponding language, words corresponding to the sound are recognized from a phoneme unit recognition result, a sentence is recognized from the words corresponding to the sound using the language model of the corresponding language, and meaning information or intention information corresponding to the recognized sentence is acquired using the NLP engine of the corresponding language. That is, recognizing speech using the speech recognition model may include generating intention information corresponding to the speech by sequentially using the acoustic model, the language model and the NLP model. Hereinafter, the term phone and the term phoneme may be used interchangeably and the present disclosure includes embodiments in which the term phone and the term phoneme are interchanged.

The processor 180 may recognize speech included in speech data in phone or phoneme units using the acoustic model of a main language (or a main language acoustic model), recognize words in the speech data using a phone-unit recognition result or a phoneme-unit recognition result, and calculate a word recognition reliability of each recognized word. The processor 180 may distinguish words included in the speech data based on blank or silence.

The processor 180 may input the speech data to the input layer of the acoustic model of the main language in predetermined window units and the output layer of the acoustic model of the main language may output a probability that the input window-unit speech data corresponds to each phoneme. For example, if the main language is Korean, the output layer of the Korean acoustic model may output a probability that the input window-unit speech data corresponds to "ㄱ" and a probability that the input window-unit speech data corresponds to "ㄴ" and the like.

A largest probability value among probabilities of phonemes output from the output layer of the acoustic model may be referred to as p1 and a second largest probability value may be referred to as p2. In addition, a phoneme corresponding to p1 may be referred to a first-order phoneme and a phoneme corresponding to p2 may be referred to as a second-order phoneme. As p1 increases or as a difference between p1 and p2 (p1-p2) increases, it may be determined that the acoustic model has recognized the phoneme corresponding to the input window-unit speech data with higher accuracy. Since large p1 means that a probability that the first-order phoneme corresponds to the input window-unit speech data is high, the first-order phoneme may be regarded as a phoneme corresponding to the input window-unit speech data with a high reliability. In addition, since a large difference between p1 and p2 means that a probability that the second-order phoneme corresponds to the input window-unit speech data is low as compared to the first-order phoneme, the first-order phoneme may be regarded as a phoneme corresponding to the input window-unit speech data with a high reliability.

The word recognition reliability may mean with how high reliability the word is recognized using the acoustic model.

The processor 180 may input the window-unit speech data to the acoustic model of the main language to obtain p1 or p1-p2 corresponding to phonemes, and calculate the word recognition reliability corresponding to the recognized word based on at least one of p1 or p1-p2 corresponding to the phonemes included in the recognized word from the phoneme-unit recognition result. For example, if the word recognition reliability of a word "house" is calculated, the processor 180 may input speech data including the word "house" to an English acoustic model in window units, acquire p1 or p1-p2 corresponding to the phonemes (e.g., "hh", "aw" and "s") of the word "house" from the English acoustic model, and calculate the word recognition reliability using at least one of p1 or p1-p2 corresponding to the phonemes.

The processor 180 may determine the word recognition reliability of the word as an average of p1 of the phonemes of the word or as the average of p1-p2 of the phonemes of the word. Alternatively, the processor 180 may calculate the word recognition reliability of the specific word, by multiplying the average of p1 of the phonemes (or windows) of the specific word by a predetermined first reliability coefficient or multiplying the average of p1-p2 of the phonemes by a predetermined second reliability coefficient. For example, in a process of calculating the word recognition reliability of the word "house" recognized from the English acoustic model, if it is assumed that a first phoneme corresponding to a first window is "hh", p1 corresponding to the first window is 0.79, a first phoneme corresponding to a second window is "aw", p1 corresponding to the second window is 0.67, a first phoneme corresponding to a third window is "s" and p1 corresponding to the third window is 0.65, the processor 180 may determine the word recognition reliability of the word "house" recognized from the English acoustic model as 0.703 which is the average of p1 corresponding to the windows.

The main language may mean the language of the speech recognition model used for speech recognition of the speech data. The main language may be set by user input, may be automatically set to a language mainly used by the user in view of the past speech recognition record, or may be set to a language set in previous voice recognition. For example, if the user sets the recognized language of a speech recognizer or a speech recognition application to Korean for Korean recognition, the main language is Korean.

In addition, the processor 180 of the artificial intelligence apparatus 100 may calculate the word recognition reliability of each word included in the obtained speech data using the acoustic model of at least one sub language (S605).

The processor 180 may recognize the speech included in the speech data in phoneme units using the acoustic model of at least one sub language (or a sub language acoustic model), recognize words from the speech data using the phoneme-unit recognition result, and calculate a word recognition reliability of each of the recognized words. The processor 180 may distinguish the words included in the speech data based on blank or silence.

The processor 180 may input the speech data to the input layer of the acoustic model of the sub language in predetermined window units and the output layer of the acoustic model of the sub language may output a probability that the input window-unit speech data corresponds to each phoneme. For example, if the sub language is English, the output layer of the English acoustic model may output a probability that the input window-unit speech data corresponds to "a" and a probability that the input window-unit speech data corresponds to "b" and the like.

The processor 180 may input the window-unit speech data to the acoustic model of at least one sub language to obtain p1 or p1-p2 corresponding to phonemes, and calculate the word recognition reliability of the recognized word based on at least one of p1 or p1-p2 corresponding to the phonemes included in the recognized word from the phoneme-unit recognition result. If there is a plurality of sub languages, the processor 180 may acquire p1 or p1-p2 according to the acoustic model of each sub language for each window unit. Accordingly, the processor 180 may obtain p1 or p1-p2 of each of the plurality of sub languages even in one window unit.

The sub language may be the language of the speech recognition model subsidiarily used for speech recognition of the speech data. The sub language may be set by user input, may be automatically set to a language used by the user with a frequency having a certain level or more in view of the past speech recognition record, may be set to a language different from the main language among languages previously used for speech recognition, or may be set to a language determined to be highly related to the main language and predetermined in correspondence with the main language. For example, if the user set the recognized language of a speech recognizer or a speech recognition application to Korean for Korean recognition and the user performed English recognition in the past, the sub language may be English. For example, if Korean has many foreign words or loanwords borrowed from English or Japanese, the sub languages corresponding to Korean is set to English and Japanese in advance, and the main language is set to Korean, the sub language may be set to English and Japanese.

In addition, the processor 180 of the artificial intelligence apparatus 100 selects a languages having a highest word recognition reliability for each word (S607).

The processor 180 may compare the word recognition reliability calculated using the acoustic model of the main language with the word recognition reliability calculated using the acoustic model of the at least one sub language, and select a language having a highest word recognition reliability, for each word. That is, the language may be selected from the main language and the at least one sub language.

For example, if a user who uses English as a native language utters an English word "avenger", the English acoustic model may recognize the uttered word as "avenger" and calculate a high recognition reliability and the Korean acoustic model may recognize the uttered 어벤절 word as " 어벤절 " and calculate a high word recognition reliability. In this example, for the uttered word "avenger", the English acoustic model calculates a higher word recognition reliability than the Korean acoustic model, the processor 180 may select English which is a language having a highest word recognition reliability for the uttered word "avenger".

In addition, the processor 180 of the artificial intelligence apparatus 100 converts the speech data into text in consideration of the word recognition result corresponding to the selected language for each word (S609).

When multiple languages are included in the speech data, the acoustic model, the language model and the natural language processing model of a single language are highly likely to fail to accurately recognize speech. However, if a language for providing a highest word recognition reliability for each word of the speech data is selected using the acoustic model and the language model corresponding to each of the multiple languages, each word included in the speech data may be appropriately converted into text according to an actual language. The better the speech data is converted into text, the higher the accuracy of speech recognition is.

For each word, if the selected language is not a main language, the processor 180 may convert the speech data into text, by replacing a word recognized in correspondence with the main language with a word recognized in correspondence with the selected language or replacing the word recognized in correspondence with the main language with a word of the main language corresponding to a word recognized in correspondence with the selected language. For example, it is assumed that the main language is Korean, a user utters " 그는 " avenger " 입니다 ", the user pronounces the word "avenger" like a native speaker, the English acoustic model recognizes the uttered word "avenger" as "avenger", the Korean acoustic model recognizes the uttered word "avenger" as " 어벤절 ", and English is selected as a language having a highest word recognition reliability for the uttered word "avenger". On this assumption, the processor 180 may replace " 어벤절 " which is the word recognition result of the Korean acoustic model as the main language with "avenger" which is the word recognition result of the English acoustic model as the sub language or the Korean word " 어벤져 " corresponding to "avenger" and thus the uttered speech may be " 그는 avenger 입니다 ." instead of " 그는 어벤절입니다 ." Alternatively, this may be converted into text " 그는 어벤져입니다 ."

In addition, the processor 180 of the artificial intelligence apparatus 100 generates a speech recognition result corresponding to the speech data using the converted text (S611).

The processor 180 may generate the speech recognition result from the converted text using a natural language processing model corresponding to the main language after the speech of the speech data is converted into text in consideration of the language selected for each word. The speech recognition result of the speech data may include text converted from the speech included in the speech data or meaning information or intention information corresponding to the converted text. That is, generating the speech recognition result may mean generating intention information corresponding to the speech data or the text converted from the speech data.

In one embodiment, the processor 180 may generate the speech recognition result, by generating the intention information corresponding to the converted text using the natural language processing model stored in the memory 170.

In one embodiment, the processor 180 may transmit information on the text converted from the speech data and the main language to the artificial intelligence server 200 via the communication unit 110 and the processor 260 of the artificial intelligence server 200 may generate the speech recognition result by generating the intention information corresponding to the received text using the natural language processing model of the main language stored in the memory 230, and the artificial intelligence apparatus 100 may receive the generated speech recognition result from the artificial intelligence server 200 via the communication unit 110.

In addition, the processor 180 of the artificial intelligence apparatus 100 performs control corresponding to the generated speech recognition result (S613).

If the speech recognition result is a control command for controlling the artificial intelligence apparatus 100 or the external apparatus (not shown), the processor 180 may perform control corresponding to the control command. In particular, if the control command is a command for controlling the external apparatus (not shown), the processor 180 may generate a control signal for controlling the external apparatus (not shown) according to the control command and transmit the control signal to the external apparatus (not shown) via the communication unit 110. In addition, the processor 180 may output feedback on the control command to the user via the output unit 150 or transmit an output signal for outputting feedback on the control command to a user terminal (not shown) via the communication unit 110.

Similarly, if the speech recognition result is a query for requesting information, the processor 180 may generate response information corresponding to the query via the Internet. In addition, the processor 180 may output the generated response information via the output unit 150 or transmit an output signal for outputting the response information to the user terminal (not shown) via the communication unit 110.

The processor 180 may generate response speech for outputting the response information and audibly output the response speech via the sound output unit 152. Specifically, the processor 180 may generate a response sentence using a natural language generation (NLG) scheme, convert the generated response sentence into the response speech using a text-to-speech (TTS) engine, and output the converted response speech via the sound output unit 152.

The steps shown in FIG. 6 may be repeatedly performed and thus the artificial intelligence apparatus 100 may repeatedly recognize the speech of the user.

Figure 7:
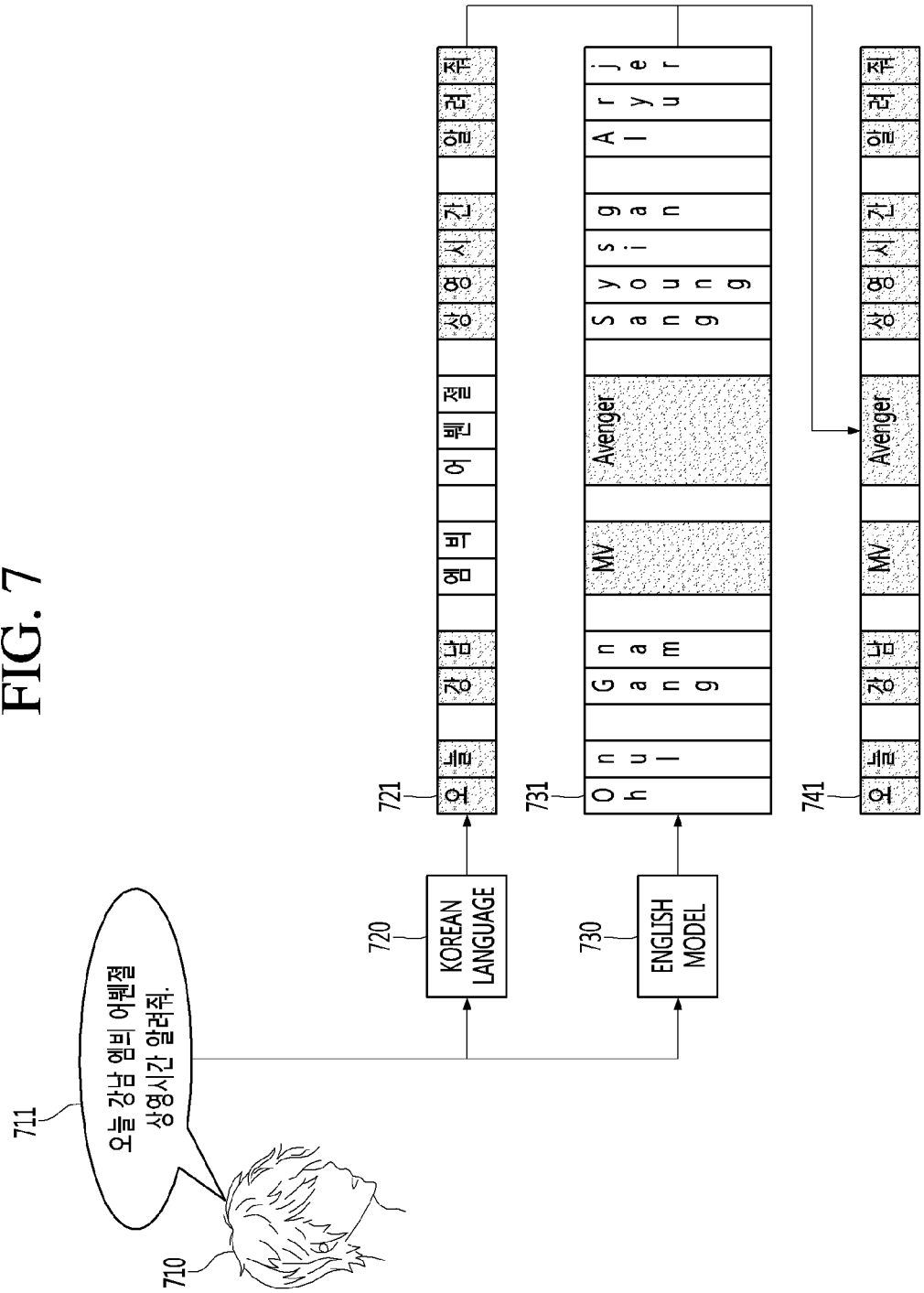
FIG. 7 is a view illustrating an example of recognizing speech including multiple languages according to an embodiment of the present disclosure.

FIG. 7 is a view illustrating an example of recognizing speech including multiple languages according to an embodiment of the present disclosure.

Referring to FIG. 7, the user may utter " 오늘 강남 엠브 어꿰절 상영시간 알려줘." 711 in Korean. In the uttered speech 711 of the user 710, "엠브" and "어꿰절" are uttered with the pronunciations of English words "MV" and "Avenger", and the uttered speech 711 of the user 710 mean that "Tell me today's showtimes of Avenger at Gangnam MV." In the uttered speech 711 of the user 710, it is assumed that "강남 엠브 (Gangnam MV)" indicates the theater "MV" located in a place "Gangnam" and "어꿰절 (Avenger)" indicates a movie "Avenger".

The processor 180 may distinguish words based on blank or silence in the uttered speech 711 of the user 710.

The processor 180 may convert, by recognizing, the uttered speech 711 of the user 710 to Korean text 721 using a Korean model 720 and calculate a word recognition reliability of each word from the converted Korean text 721. According to the Korean model 720, the converted Korean text 721 is "오늘 강남 엠브 어꿰절 상영시간 알려줘". Here, the Korean model 720 may mean a Korean acoustic model.

In addition, the processor 180 may convert, by recognizing, the uttered speech 711 of the user 710 to English text 731 using an English model 730 and calculate a word recognition reliability of each word from the converted English text 731. According to the English model 730, the converted English text 731 may be "Ohnul Gangnam MV Avenger Sangyoungsigan Alryujer". Here, the English model 730 may mean an English acoustic model.

The processor 180 may compare the word recognition reliability of each word calculated from the converted Korean text 721 with the word recognition reliability of each word calculated from the converted English text 731, and select a language having a highest word recognition reliability of each word as a result of comparison. In the converted Korean text 721, "오늘", "강남", "상영시간" and "알려줘" have higher word recognition reliabilities than the converted English text 731. In the converted English text 731, "MV" and "Avenger" have higher word recognition reliabilities than the converted Korean text 721. Accordingly, the processor 180 may select words "오늘", "강남", "상영시간" and "알려줘" from the converted Korea text 721 and select words "MV" and "Avenger" from the converted English text 731. That is, the processor 180 may select Korean as the language of parts corresponding to words "오늘", "강남", "상영시간" and "알려줘" and select English as the language of parts corresponding to words "MV" and "Avenger" in the uttered speech 711 or the speech data.

The processor 180 may recognize and convert the uttered speech 711 of the user into text 741 in consideration of the word recognition result corresponding to the selected language of each word. That is, the processor 180 may convert the uttered speech 711 into text "오늘" "강남" MV Avenger "상영시간 알려줘" 741 in consideration of the words "오늘", "강남", "상영시간" and "알려줘" in the converted Korean text 721 and the words "MV" and "Avenger" in the converted English text 731.

Even if words of multiple languages are included in one sentence, the uttered speech may be recognized using the acoustic model of each language, a language having a highest word recognition reliability may be selected for each word and the uttered speech is converted into text, thereby more accurately recognizing the uttered speech of the user.

Figure 8:
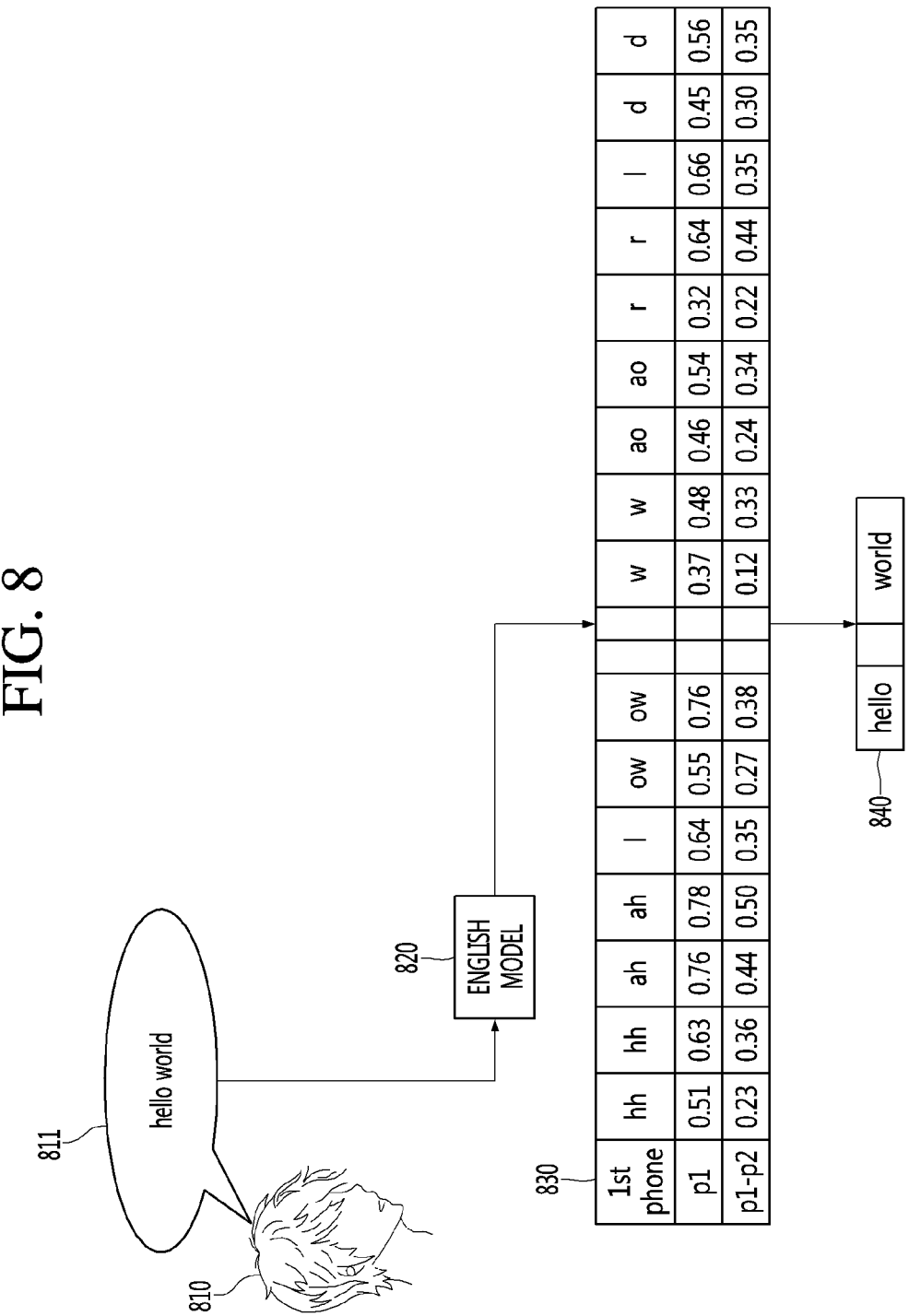
FIG. 8 is a view illustrating an example of calculating a word recognition reliability according to an embodiment of the present disclosure.

FIG. 8 is a view illustrating an example of calculating a word recognition reliability according to an embodiment of the present disclosure.

Referring to FIG. 8, a user 810 may utter "hello world" 811 in English.

The processor 180 may calculate a probability of each phone for each predetermined window unit using an English model 820, for the uttered speech 811 of the user 810. Here, the English model 820 may mean an English acoustic model.

Specifically, the processor 180 may input speech data corresponding to the uttered speech 811 to the English model 820 in predetermined window units and the English model 820 may calculate a probability 830 corresponding to each phone for each input window unit and output a result 840 of recognizing the uttered speech based on the probability 830 corresponding to each phone calculated for each window unit. p1 may mean a largest probability value among probabilities corresponds to phones, p2 may mean a second largest probability value among the probabilities corresponding to phones, and the phone corresponding to p1 may be referred to as a first-order phone or a first phone and the phone corresponding to p2 may be referred to as a second-order phone or a second phone.

According to the English model 820, the first-order phone or the first phone recognized from the speech data corresponding to the uttered speech 811 of the user 810 is sequentially "hh", "hh", "ah", "ah", "l", "ow", "ow", " ", " ", "w", "w", "ao", "ao", "r", "r", "l", "d", and "d". The processor 180 may distinguish words from each other based on blank or silence, and thus the speech data corresponding to the uttered speech 811 may be divided into first phones "hh", "hh", "ah", "ah", "l", "ow", and "ow" corresponding to a first word and first phones "w", "w", "ao", "ao", "r", "r", "l", "d", and "d" corresponding to a second word. In addition, the processor 180 may recognize the uttered speech 811 of the user 810 as words "hello" and "world" based on the first phones determined for each word.

When each word is recognized in the speech data corresponding to the uttered speech 811, the processor 180 may calculate the word recognition reliability based on at least one of p1 of each word or a difference between p1 and p2 of each word. For example, the processor 180 may determine 0.66 (=(0.51+0.63+0.76+0.78+0.64+0.55+0.76)/7) which is an average value of p1 values in the phones corresponding to the word "hello" as the word recognition reliability corresponding to the word "hello" or determine 0.36 (=(0.23+0.36+0.44+0.50+0.35+0.27+0.38)/7) which is an average value of the (p1-p2) values in the phones corresponding to the word "hello" as the word recognition reliability corresponding to the word "hello". Alternatively, the processor 180 may determine a weighted sum of the average of the p1 values and the (p1-p2) values in the phones corresponding to each word as the word recognition reliability corresponding to each word.

FIG. 8 shows an example in which the processor 180 recognizes speech using the English model 820 with respect to the uttered speech 811 of the user 810. The processor 180 may recognize the speech using another language model with respect to the same uttered speech 811. As in the example of FIG. 7, the processor 180 may generate a speech recognition result based on the result of recognizing the speech using multiple languages models and each word recognition reliability.

Figure 9:
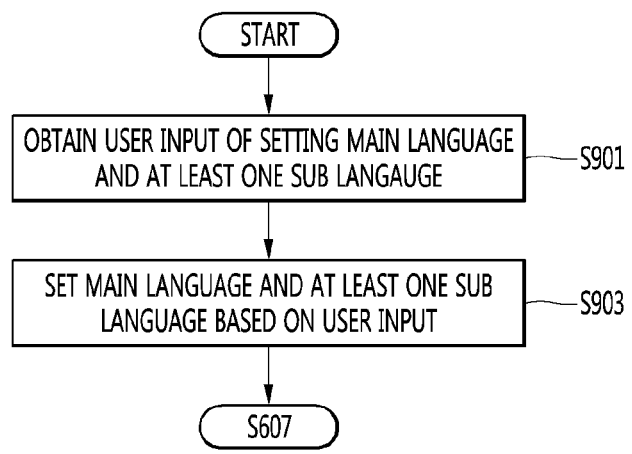
FIG. 9 is a flowchart illustrating a method of setting a main language and a sub language according to an embodiment of the present disclosure.

FIG. 9 is a flowchart illustrating a method of setting a main language and a sub language according to an embodiment of the present disclosure.

Referring to FIG. 9, the processor 180 acquires user input of setting a main language and at least one sub language via the input unit 110 (S901).

In addition, the processor 180 sets the main language and the at least one sub language based on user input (S903). That is, the user may directly set the main language and the at least one sub language to be used for speech recognition.

After the main language and the at least one sub language are set in steps S901 and S903, the processor 180 may perform steps S601 to S613 shown in FIG. 6 to recognize the speech of the user.

Figure 10:
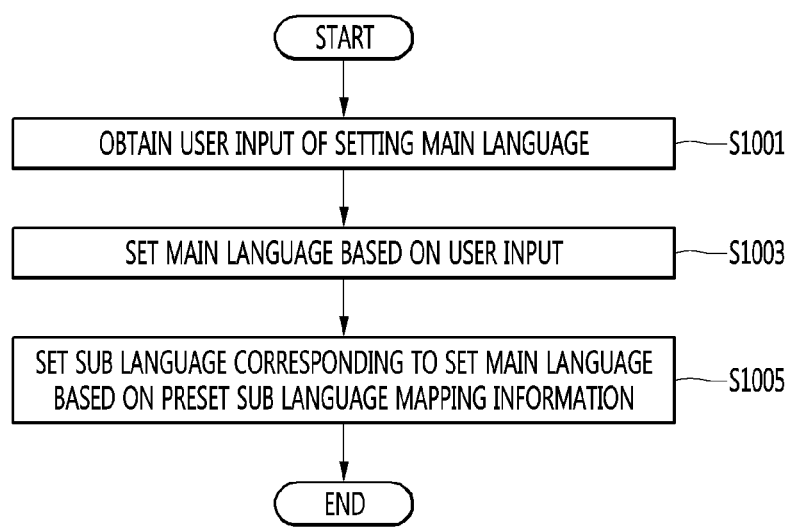
FIG. 10 is a flowchart illustrating a method of setting a main language and a sub language according to an embodiment of the present disclosure.

FIG. 10 is a flowchart illustrating a method of setting a main language and a sub language according to an embodiment of the present disclosure.

Referring to FIG. 10, the processor 180 acquires user input for setting the main language via the input unit 110 (S1001).

In addition, the processor 180 sets the main language based on user input (S1003). That is, the user may directly set a main language to be used for speech recognition.

In addition, the processor 180 sets a sub language corresponding to the set main language based on preset sub language mapping information (S1005).

The preset sub language mapping information may include a table in which at least one sub language corresponds to one main language.

A correspondence relationship between the main language and the sub language may refer to a relation in which a sub language frequently used in a specific main language corresponds to the main language according statistical analysis. For example, if Korean is a main language and Korean is frequently used together with English and Japanese in this order according to statistics, Korean as the main language may correspond to English and Japanese as the sub language. In this case, the processor 180 may set the sub language to English and Japanese based on such a correspondence relationship if the user sets the main language to Korean.

Further, a predetermined number of sub languages corresponding to one main language may be selected in order of a frequency of being used together, or only languages having a frequency of being used together or a ratio of the frequency exceeding a predetermined reference value may be selected. For example, if Korean is a main language, Korean is used together with English and Japanese in this order according to statistics and only one sub language corresponds to one main language, Korean as the main language may correspond to English as the sub language. In this case, if the user sets the main language to Korean, the processor 180 may set the sub language to English based on such a correspondence relationship.

That is, even if the user directly sets only the main language to be used for speech recognition, the processor 180 may automatically set the sub language suitable for the set main language.

After the main language and the at least one sub language are set in steps S1001 to S1005, the processor 180 may perform steps S601 to S613 shown in FIG. 6 to recognize the speech of the user.

FIG. 11 is a view illustrating an example of sub language mapping information according to an embodiment of the present disclosure.

Referring to FIG. 11, Korean as a main language may correspond to English and Japanese as sub languages, English as a main language may correspond to Spanish and French as sub languages, and Japanese as a main language may correspond to English as a sub language.

The sub language mapping information shown in FIG. 11 is merely an example and the present disclosure is not limited thereto.

According to various embodiments of the present disclosure, it is possible to improve speech recognition accuracy, by recognizing uttered speech of a user with multiple languages using acoustic models of several languages.

According to various embodiments of the present disclosure, it is possible to appropriately recognize speech according to actual language use modality, by automatically setting sub languages determined as being frequently used together with a set main language.

According to an embodiment of the present disclosure, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

Other implementations are within the scope of the following claims.

What is claimed is:

1. An artificial intelligence apparatus for recognizing speech with multiple languages, comprising:
a microphone; and a processor configured to: obtain, via the microphone, speech data including speech of a user with multiple languages,
determine a word recognition reliability of each word in the obtained speech data using an acoustic model of a main language, wherein the main language is set based on receiving a main language setting input,
determine a word recognition reliability of each word in the obtained speech data using an acoustic model of at least one sub language, wherein the at least one sub language is set according to the set main language based on preset sub language mapping information, wherein the preset sub language mapping information comprises a correspondence relationship between the main language and a specific sub language such that the specific sub language is set as one of the at least one sub language based on a ratio of a frequency of the main language and the specific sub language being used together exceeding a preset reference value, select a language having the highest word recognition reliability for each word, convert the obtained speech data into text according to a word recognition result corresponding to the selected language for each word, and generate a speech recognition result corresponding to the obtained speech data using the converted text.

2. The artificial intelligence apparatus of claim 1, wherein the processor is further configured to receive a sub language setting input of the user, wherein the at least one sub language is set based on the received sub language setting input.

3. The artificial intelligence apparatus of claim 1, wherein the processor is further configured to:
determine probabilities that each predetermined window unit of the obtained speech data corresponds to each phoneme using an acoustic model for each language in the main language and the at least one sub language, wherein the word recognition reliability of each word is determined for each language using at least one of a highest probability value p1 among the determined probabilities or a difference p1-p2 between the highest probability p1 and a second highest probability p2 among the determined probabilities.

4. The artificial intelligence apparatus of claim 3, wherein the processor is further configured to distinguish words in the obtained speech data based on a blank or silence.

5. The artificial intelligence apparatus of claim 4, wherein the processor is configured to:
determine an average of the p1 or an average of the p1-p2 corresponding to phoneme included in a word for each word in the obtained speech data, and
determine the word recognition reliability of the corresponding word based on the determined average.

6. The artificial intelligence apparatus of claim 1, wherein the speech data is converted into text by selecting the word recognition result corresponding to the selected language for each word in the speech data.

7. The artificial intelligence apparatus of claim 1, wherein the speech data is converted into text by replacing the word recognition result corresponding to a first word with a second word in the main language which corresponds to a word recognition result corresponding to the selected language for the first word based on the selected language for the first word in the speech data not being the main language.

8. A method of recognizing speech with multiple languages, the method comprising:
obtaining, via a microphone, speech data including speech of a user with multiple languages;
determining a word recognition reliability of each word in the obtained speech data using an acoustic model of a main language, wherein the main language is set based on receiving a main language setting input;
determining a word recognition reliability of each word in the obtained speech data using an acoustic model of at least one sub language, wherein the at least one sub language is set according to the set main language based on preset sub language mapping information, wherein the preset sub language mapping information comprises a correspondence relationship between the main language and a specific sub language such that the specific sub language is set as one of the at least one sub language based on a ratio of a frequency of the main language and the specific sub language being used together exceeding a preset reference value;
selecting a language having the highest word recognition reliability for each word;
converting the obtained speech data into text according to a word recognition result corresponding to the selected language for each word; and
generating a speech recognition result corresponding to the obtained speech data using the converted text.

9. A non-transitory recording medium stored thereon a computer program for controlling a processor to perform a method of recognizing speech with multiple languages, the method comprising:
obtaining, via a microphone, speech data including speech of a user with multiple languages;
determining a word recognition reliability of each word in the obtained speech data using an acoustic model of a main language, wherein the main language is set based on receiving a main language setting input;
determining a word recognition reliability of each word in the obtained speech data using an acoustic model of at least one sub language, wherein the at least one sub language is set according to the set main language based on preset sub language mapping information, wherein the preset sub language mapping information comprises a correspondence relationship between the main language and a specific sub language such that the specific sub language is set as one of the at least one sub language based on a ratio of a frequency of the main language and the specific sub language being used together exceeding a preset reference value;
selecting a language having the highest word recognition reliability for each word;
converting the obtained speech data into text according to a word recognition result corresponding to the selected language for each word; and generating a speech recognition result corresponding to the obtained speech data using the converted text.

\* \* \* \* \*